United States Patent
Chae

(10) Patent No.: US 9,477,831 B2
(45) Date of Patent: Oct. 25, 2016

(54) ELECTRONIC DEVICE AND METHOD FOR RELEASING LOCK USING ELEMENT COMBINING COLOR AND SYMBOL

(71) Applicant: Samsung Electronics Co. Ltd., Suwon-si, Gyeonggi-do (KR)

(72) Inventor: Kyung-Duk Chae, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 13/924,873

(22) Filed: Jun. 24, 2013

(65) Prior Publication Data

US 2014/0013416 A1 Jan. 9, 2014

(30) Foreign Application Priority Data

Jul. 6, 2012 (KR) ........................ 10-2012-0073899

(51) Int. Cl.
*G06F 7/04* (2006.01)
*G06F 21/36* (2013.01)

(52) U.S. Cl.
CPC .................................... *G06F 21/36* (2013.01)

(58) Field of Classification Search
CPC .................. G06F 21/36; G06F 21/40; G06F 2221/2103; G06F 2221/2107; G06F 21/30; G06F 21/6218; G06F 21/62; G06F 21/31; H04L 9/3271; H04L 9/3228; H04L 63/0838; H04L 2463/082; H04L 63/08

See application file for complete search history.

(56) References Cited

U.S. PATENT DOCUMENTS

| 9,128,601 | B2 | 9/2015 | Fadell et al. |
| 2006/0098841 | A1 | 5/2006 | Tuyls et al. |
| 2007/0136573 | A1* | 6/2007 | Steinberg ...................... 713/155 |
| 2009/0063850 | A1* | 3/2009 | Joram et al. .................. 713/155 |
| 2009/0083847 | A1 | 3/2009 | Fadell et al. |
| 2010/0002878 | A1 | 1/2010 | Foong |
| 2011/0088086 | A1 | 4/2011 | Swink et al. |
| 2011/0307952 | A1 | 12/2011 | Xie |
| 2013/0212674 | A1 | 8/2013 | Boger et al. |

FOREIGN PATENT DOCUMENTS

| CN | 101621564 A | 1/2010 |
| CN | 101809581 A | 8/2010 |
| CN | 102253803 A | 11/2011 |
| CN | 102279910 A | 12/2011 |
| CN | 102385672 A | 3/2012 |
| KR | 10-2009-0013432 A | 2/2009 |
| KR | 10-2009-0065766 A | 6/2009 |
| WO | 2004/081767 A1 | 9/2004 |
| WO | 2011/162832 A1 | 12/2011 |

\* cited by examiner

*Primary Examiner* — Shewaye Gelagay
*Assistant Examiner* — Carlton Johnson
(74) *Attorney, Agent, or Firm* — Jefferson IP Law, LLP

(57) ABSTRACT

An electronic device and a method thereof for releasing lock using an element combining color and symbol are provided. In the method, at least two groups including at least two elements combining color and symbol are displayed. One element included in each of the at least two groups is allowed to be sequentially selected at least one time. When it is determined that a sequence of the sequentially selected elements is the same as a set sequence, a lock of the electronic device is released.

18 Claims, 8 Drawing Sheets

FIG.2A

INPUT THE NUMBER OF
ELEMENTS

2

| 1 | 2 | 3 |
| 4 | 5 | 6 |
| 7 | 8 | 9 |
|   | 0 | ← |

FIG.2B

SELECT FIRST ELEMENT

| COLOR | SYMBOL | COMBINATION OF COLOR AND SYMBOL |

FIG.2C

SELECT COLOR OF FIRST ELEMENT

| FIRST COLOR | SECOND COLOR | THIRD COLOR |
| FOURTH COLOR | FIFTH COLOR | SIXTH COLOR |
| SEVENTH COLOR | EIGHTH COLOR | NINTH COLOR |

⋮

SELECT

FIG.2D

SELECT SECOND ELEMENT

| COLOR | SYMBOL | COMBINATION OF COLOR AND SYMBOL |

ELECTRONIC DEVICE AND METHOD FOR RELEASING LOCK USING ELEMENT COMBINING COLOR AND SYMBOL

PRIORITY

This application claims the benefit under 35 U.S.C. §119 (a) of a Korean patent application filed on Jul. 6, 2012 in the Korean Intellectual Property Office and assigned Serial No. 10-2012-0073899, the entire disclosure of which is hereby incorporated by reference.

BACKGROUND OF THE INVENTION

1. Field of the Invention

The present invention relates to a method of unlocking and an electronic device thereof. More particularly, the present invention relates to a method of unlocking an electronic device via pattern matching.

2. Description of the Related Art

An electronic device may store important data such as a large capacity address book, business data, and a personal financial authentication certificate. Therefore, for security, a user sets a lock on an electronic device using a password or pattern matching. However, when a lock is set to an electronic device using a password, an unlocking speed is slow as compared to releasing the lock using pattern matching.

Also, when a lock is set using pattern matching according to the related art, security is reduced. For example, since a pattern is easily exposed to other people's eyes even when other people in the neighborhood only glances at a user releasing the lock of an electronic device using pattern matching, the particular pattern used to unlock the electronic device may be easily determined by others.

Of course, when the user sets a difficult pattern or password in order to raise security, the security is raised but the user has a difficulty in using an electronic device. When the user sets an easy pattern or password, the user has convenience in using the electronic device but the security lowers. Therefore, an unlocking method for improving security while swiftly releasing lock setting of an electronic device is required.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for reinforcing a user's security while improving speed for releasing lock of an electronic device.

Another aspect of the present invention is to provide an apparatus and a method for preventing a pattern from being easily exposed since a user has to select at least two elements combining color and symbol in order to release the lock of an electronic device.

Another aspect of the present invention is to provide an apparatus and a method for allowing a drag trace for releasing a lock to change all the time (i.e., each time the elements are displayed to release the lock) since elements combining color and symbol are arranged at random whenever an unlock screen is displayed.

Another aspect of the present invention is to provide an apparatus and a method for improving security by lowering the possibility that a user's pattern is pirated since color and symbol forming one element may be set among innumerable colors and symbols.

In accordance with an aspect of the present invention, a method for operating an electronic device is provided. The method includes displaying at least two groups including at least two elements combining color and symbol, allowing one element included in each of the at least two groups to be sequentially selected at least one time, and when it is determined that a sequence of the sequentially selected elements is the same as a set sequence, releasing a lock of the electronic device.

According to another aspect of the present invention, the at least two elements may be arranged at random each time the at least two groups are with different combination of color and symbol for each group.

According to another aspect of the present invention, the at least two elements may be arranged such that colors and symbols do not overlap for each group.

According to another aspect of the present invention, the at least two elements may be identified by color, a symbol, or a combination of color and symbol.

According to another aspect of the present invention, the allowing of the one element included in each of the symmetrical two groups to be sequentially selected at least one time includes: when the one element is selected an odd number of times, repeating a process, at least one time, of starting a drag trace with a selection of a first element included in a first group of the at least two groups selected, and allowing a third element included in the first group to be selected when a second element included in a second group is selected.

According to another aspect of the present invention, the allowing of the one element included in each of at least two groups to be sequentially selected at least one time includes: when the one element is selected an even number of times, repeating a process, at least one time, of starting a drag trace with a selection of a first element included in a first group of the two groups, and allowing a second element included in a second group to be selected. The method may further include determining whether a sequence of the selected at least two elements is the same as a set sequence.

According to another aspect of the present invention, the method may further include, when determining that the sequence of the selected at least two elements is not the same as the set sequence, rearranging at least two elements included in each group at random.

According to another aspect of the present invention, a sequence of the sequentially selected elements may be a drag trace for releasing the lock.

According to another aspect of the present invention, the drag trace may change whenever an input is made.

According to another aspect of the present invention, the group may include a line.

In accordance with another aspect of the present invention, an electronic device is provided. The electronic device includes a touchscreen for displaying at least two groups including at least two elements combining color and symbol, and allowing one element included in each of the at least two groups to be sequentially selected at least one time, and a processor unit for, when it is determined that a sequence of the sequentially selected element is the same as a set sequence, releasing lock.

According to another aspect of the present invention, when the one element is selected an odd number of times, the processor unit may repeat a process, at least one time, of starting a drag trace with a selection of a first element included in a first group of the at least two groups, and allowing a third element included in the first group to be selected when a second element included in a second group is selected.

According to another aspect of the present invention, when the one element is selected an even number of times, the processor unit may repeat a process, at least one time, of starting a drag trace with a selection of a first element included in a first group of the at least two groups, and allowing a second element included in a second group to be selected.

According to another aspect of the present invention, the processor unit may determine whether a sequence of the selected at least two elements is the same as a set sequence.

According to another aspect of the present invention, when determining that the sequence of the selected at least two elements is not the same as the set sequence, the processor unit may rearrange at least two elements included in each group at random.

According to another aspect of the present invention, a sequence of the sequentially selected elements may be a drag trace for releasing the lock.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 2A-2H are views illustrating setting a number of elements and a configuration of an element according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
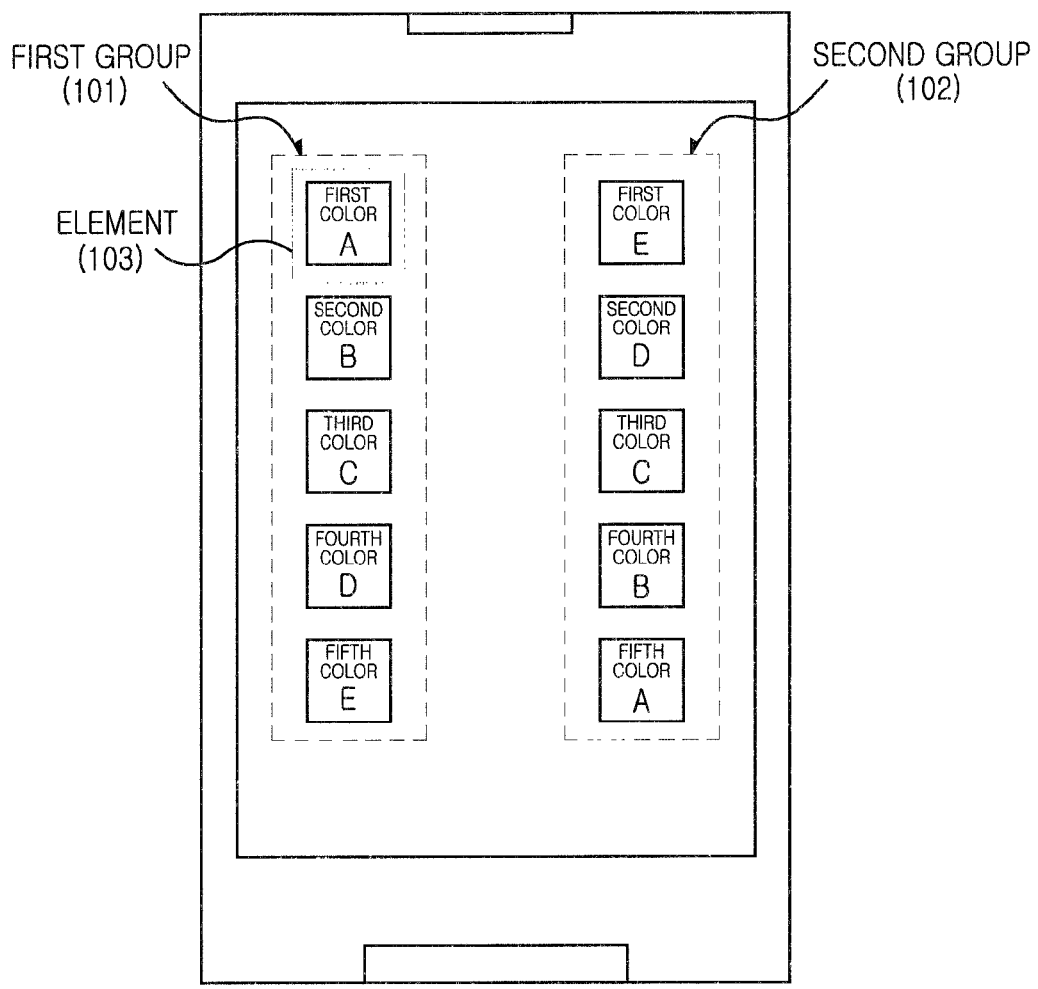
FIG. 1 is a view illustrating a construction of an electronic device for releasing lock using an element combining color and symbol according to an exemplary embodiment of the present invention.

FIG. 1 is a view illustrating a construction of an electronic device, for releasing lock using an element combining color and symbol according to an exemplary embodiment of the present invention.

Referring to FIG. 1, when a user turns on power or inputs a start button, etc. of the electronic device in order to use the electronic device, a first group 101 and a second group 102 may be symmetrically displayed on a touchscreen of the electronic device.

Each of the first group 101 and the second group 102 includes at least two elements 103. The two groups 101 and 102 may be displayed on the touchscreen of the electronic device. As illustrated in FIG. 1, the two groups 101 and 102 may be symmetrically displayed on the touchscreen of the electronic device left and right, and may be symmetrically displayed on the touchscreen up and down. While the two groups 101 and 102 may be displayed on the touchscreen in the present exemplary embodiment, three or four groups may also be displayed. As illustrated in FIG. 1, the two groups may be displayed on the touchscreen of the electronic device, so that a user may select one element 103 included in the first group 101 and the second group 102 in regular sequence at least one time to release the lock of the electronic device.

The user may set a group where a drag trace starts among the two groups 101 and 102 in order to release lock of the electronic device. When the user sets a specific group as the group where the drag trace starts, the user should select one element included in the relevant group in order to release the lock of the electronic device. For example, when the user sets the first group 101 as the group where the drag trace starts, the user should select one element of the first group 101 and then select one element included in the second group 102. Similarly, when the user sets the second group 102 as the group where the drag trace starts, the user should select one element of the second group 102 and then select one element included in the first group 101. It is convenient that a right-handed user sets the first group 101 arranged in the left of the touch screen of the electronic device as the group where the drag trace starts. It is convenient that a left-handed user sets the second group 102 arranged in the right of the touch screen of the electronic device as the group where the drag trace starts. However, any of the two groups 101 and 102 may be selected as the group where the drag trace starts, regardless of whether the user is right or left-handed.

At least two elements 103 are included in each of the groups 101 and 102 and displayed. The element 103 may be defined as being identified by color, a symbol, and a combination of color and symbol. The user may set the total number of elements to select and color and symbol of each element in order to release lock of the electronic device. Each element may be discriminated by color, a symbol, and a combination of color and symbol. The user may set an element of only color, set an element of only a symbol, and set an element combining color and symbol in order to release lock of the electronic device. For example, the user may set an element of a "first color", set an element of a "first symbol", and set an element of a "first color and first symbol" in order to release lock of the electronic device. Therefore, each element may be identified by color, a symbol, and a combination of color and symbol.

The elements 103 according to exemplary embodiments of the present invention are arranged such that a combination of color and symbol does not overlap for each group 101 and 102. An element of the same color, an element of the same symbol, and an element combining the same color and the same symbol cannot exist in one group. For example, five elements 103 of "A of first color", "B of second color", "C of third color", "D of fourth color", and "E of fifth color" are arranged in the first group 101 such that colors and symbols are not the same. Also, five elements 103 of "E of first color", "D of second color", "C of third color", "B of fourth color", and "A of fifth color" are arranged in the second group 102 such that colors and symbols are not the same. This is because when at least two elements of the same color, same symbol, and the same color and symbol are arranged, the user cannot drag two elements included in one group simultaneously.

The elements 103 may be arranged at random all the time (i.e., each time the elements 103 are displayed) with a different combination of color and symbol for each group. At least two elements displayed for each group on the touchscreen of the electronic device initially are not fixed but may be differently arranged all the time. For example, even when five elements of "A of first color", "B of second color", "C of third color", "D of fourth color", and "E of fifth color" are initially arranged in regular sequence in one group, the above sequence is mixed at random when the elements are arranged afterward, so that "E of sixth color", "C of seventh color", "B of eighth color", "A of fourth color", and "B of fifth color" may be rearranged. However, an element of color, a symbol, and a combination of color and symbol set for releasing lock of the electronic device by the user is fixedly rearranged. For example, in the above example, suppose that "B of second color" and "D of fourth color" are elements set for releasing the lock of the electronic device. Colors and symbols of other elements may be mixed and rearranged at random, but combinations of "B of second color" and "D of fourth color" do not change and only a sequence in which the elements of "B of second color" and "D of fourth color" are displayed may change. Also, when the electronic device allows the user to select elements in a sequence different from the set sequence, respective elements are rearranged at random differently from the initial arrangement.

A method for releasing lock using an element combining color and symbol according to the present invention is described below. The user should set the number of elements to select and a component of each element. The user should set the total number of elements to set and one of color, a symbol, and a combination of color and symbol among components of respective elements combining color and symbol in order to release lock setting of the electronic device. For example, when the user selects 2 as the number of elements in order to release the lock setting of the electronic device, the user should set one of color, a symbol, and a combination of color and symbol of each element in order to identify two elements. Each element may be set using only color, set using only a symbol, or set using a combination of color and symbol. A first element may be set using only first color and a second element may be set using a combination of second color and a first symbol.

When the number of elements and each component have been set, the electronic device should select set elements by the total number of elements in regular sequence to releases lock. At least two elements 103 are included each group 101 and 102, and at least two elements 103 combining color and symbol should be selected to release lock of the electronic device. To release the lock of the electronic device, one element included in each of the symmetrical two groups should be selected sequentially at least one time. When one element displayed on the touchscreen is selected an odd number of times, assuming that a drag trace starts in a first group of the two groups, the drag trace ends in the first group. For example, consider a case where elements for releasing the lock of the electronic device are set in an element sequence of "A of first color", "B of fourth color", and "E of fifth color". Under the above assumption, the electronic device may release the lock only when the drag trace is performed only in the element sequence of "A of first color", "B of fourth color", and "E of fifth color". When one element displayed on the touchscreen is selected an odd number of times, the drag trace ends in the group where the drag trace starts.

Similarly, when one element displayed on the touchscreen is selected an even number of times, assuming that a drag trace starts in a first group of the two groups, the drag trace ends in the second group. For example, suppose a case where elements for releasing lock of the electronic device are set in an element sequence of "A of first color" and "B of fourth color". Under the above assumption, the electronic device may release the lock only when the drag trace is performed in the element sequence of "A of first color" and "B of fourth color". When one the element displayed on the touchscreen is selected an even number of times, the drag trace ends in the group symmetric with the group where the drag trace starts.

FIGS. 2A-2H are views illustrating setting the number of elements and configuration of an element according to an exemplary embodiment of the present invention.

Figure 2E:
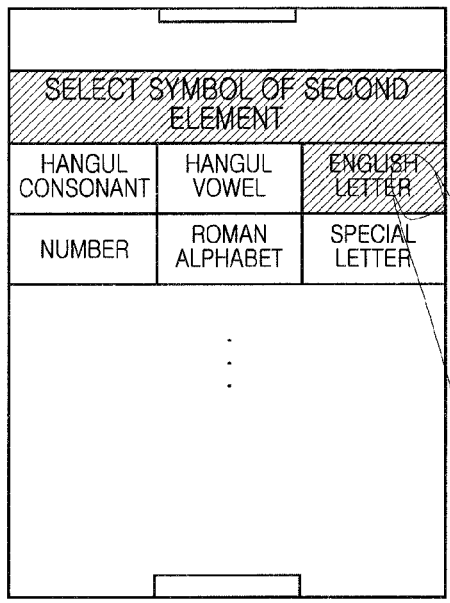

Referring to FIGS. 2A-2H, though not shown in FIGS. 2A-2H, to set the number of elements and configuration of each element, an application according to the present invention is executed. After that, as illustrated in FIG. 2A, the electronic device receives the number of elements by displaying numerical keys, etc. for receiving the number of elements together with a guide message saying to input the number of elements on the touchscreen. Since a number of 2 has been input in the present exemplary embodiment, the electronic device should allow two elements in total to be selected to release the set lock.

FIG. 2B is a view illustrating an exemplary embodiment for receiving a first element according to an exemplary embodiment of the present invention. Referring to FIG. 2B, when the electronic device receives the number of elements, the electronic device receives components of respective elements by the received number of elements in regular sequence. The electronic device displays an icon for selecting one of color, a symbol, and a combination of color and symbol which are components by which the first element is to be identified together with a guide message saying to select the first element. The electronic device may allow a user to set an element of only color, an element of only a symbol, or an element combining color and symbol among elements combining color and symbol. The user may set an element of only color, an element of only a symbol, or an element combining color and symbol in order to release the lock of the electronic device. In the example shown in FIG. 2B, the electronic device has received an input such that an element of only color is set as the first element.

FIG. 2C is a view illustrating an exemplary embodiment for selecting color of a first element according to an exemplary embodiment of the present invention.

Referring to FIG. 2C, the electronic device that has received an input such that an element of only color is set as the first element displays a plurality of stored colors so that one of colors may be selected together with a guide message saying to select color of the first element on the touchscreen. The plurality of stored colors may be any number of colors. The general public can discriminate between any of about one thousand color, and experts can discriminate between any of about two thousand colors. Therefore, even when color is given to one element so that the general public may discriminate it, about one thousand color may be used. Similar colors are excluded and colors that can be definitely discriminated are used so that a user may easily discriminate color. In the example illustrated in FIG. 2C, the electronic device has received an input such that a first color is set as color of the first element.

FIG. 2D is a view illustrating an exemplary embodiment for receiving a second element according to an exemplary embodiment of the present invention.

Referring to FIG. 2D, the electronic device displays an icon for selecting one of color, a symbol, and a combination of color and symbol which are components by which the second element is to be identified together with a guide message saying to select the second element. The electronic device may allow a user to set an element of only color, an element of only a symbol, or an element combining color and symbol among elements combining color and symbol. The user may set an element of only color, an element of only a symbol, or an element combining color and symbol in order to release the lock of the electronic device. In the example illustrated in FIG. 2D, the electronic device has received an input such that an element of only a symbol is set as the second element.

FIG. 2E is a view illustrating an exemplary embodiment for selecting a symbol of a second element according to an exemplary embodiment of the present invention.

Referring to FIG. 2E, the electronic device that has received an input such that an element of only a symbol is set as the second element displays a plurality of stored symbols so that one of the symbols may be selected together with a guide message saying to select a symbol of the second element on the touchscreen. The plurality of stored symbols may include various symbols such as Hangul consonant, Hangul vowel, English letters (including capital and lower case letters), numbers, Roman alphabet, special letters, etc. In the example illustrated in FIG. 2E, the electronic device has received an input such that an English letter is set as a symbol of the second element.

Figure 2F:
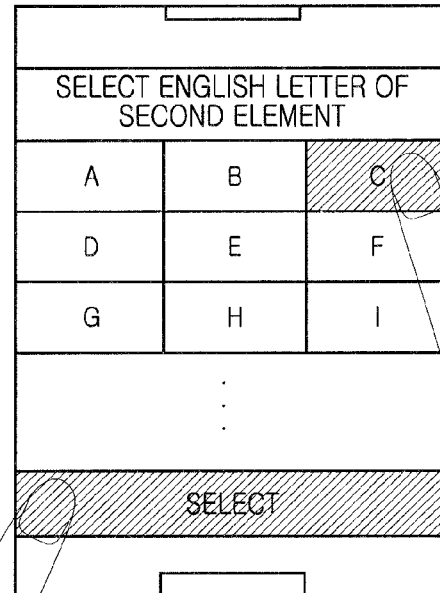

FIG. 2F is a view illustrating an exemplary embodiment for selecting an English letter of a second element according to an exemplary embodiment of the present invention.

Referring to FIG. 2F, the electronic device that has received an input such that an element of only an English letter is set as the second element displays twenty six English letters so that one of the English letters may be selected together with a guide message saying to select an English letter of the second element on the touchscreen. In the example illustrated in FIG. 2F, the electronic device has received an input such that an English letter C is set as a symbol of the second element.

Figure 2G:
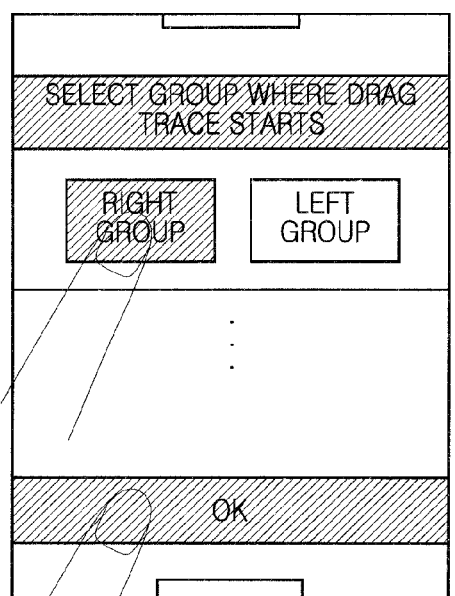

FIG. 2G is a view illustrating an exemplary embodiment for selecting a group where a drag trace starts according to an exemplary embodiment of the present invention.

Referring to FIG. 2G, the electronic device displays an icon for selecting a right group and a left group to select one of the left group and the right group together with a guide message saying to select a group where the drag trace starts on the touchscreen. When a user sets a specific group as the group where the drag trace starts, the user should select one element included in the relevant group first in order to release lock of the electronic device. For example, when the user sets the right group as the group where the drag trace starts, the user should select one element of the right group and then select one element included in the left group. Similarly, when the user sets the left group as the group where the drag trace starts, the user should select one element of the left group and then select one element included in the right group. It is convenient that a right-handed user sets the left group arranged on the left of the touchscreen of the electronic device as the group where the drag trace starts, and a left-handed user sets the right group arranged on the right of the touchscreen of the electronic device as the group where the drag trace starts. However, as mentioned above, either the left group or the right group may be selected regardless of whether the user is right or left-handed.

Figure 2H:
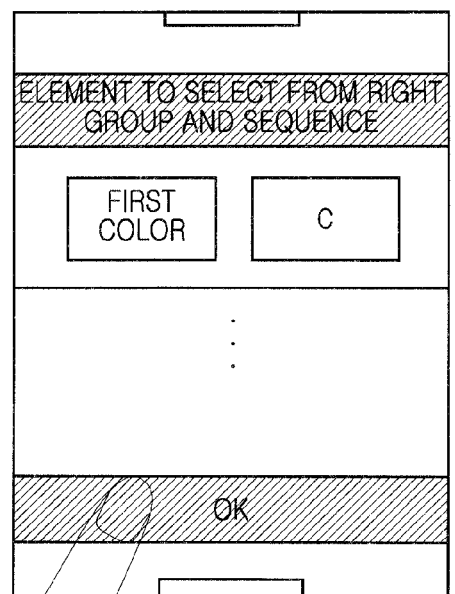

FIG. 2H is a view illustrating an exemplary embodiment where the number of elements and configuration of respective elements are finally set according to an exemplary embodiment of the present invention.

Referring to FIG. 2H, the electronic device may display configuration of respective elements finally selected via the above processes of FIG. 2A to FIG. 2G. In the example illustrated in FIG. 2H, two elements have been set. A first color has been selected for the first element, and an English letter C has been selected for the second element. In addition, a right group has been selected as a group where the drag trace starts. Therefore, a guide message saying to perform drag trace using the first color and the English letter C from the right group in order to release lock of the electronic device is finally displayed on the touchscreen of the electronic device.

While not shown in FIGS. 2A-2H, a symbol of an element to be displayed on each group may be set such that only one kind may be displayed and may be set such that various kinds of symbols may be displayed at random. For example, when the electronic device is set to arrange a symbol to be included in an element using only an English letter, the electronic device may arrange a letter at random among 26 English letters to display an element combining specific color and the letter. When the electronic device is set to arrange various kinds of stored symbols at random, the electronic device may arrange symbols at random by the set number of symbols to display an element combining specific color and the symbols.

FIGS. 3A-3E are views illustrating selecting an N-th element combining color and symbol according to an exemplary embodiment of the present invention.

Figure 3A:
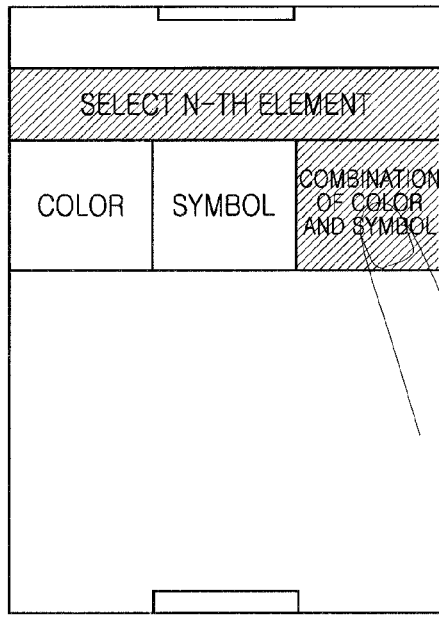
FIGS. 3A-3E are views illustrating selecting an N-th element combining color and symbol according to an exemplary embodiment of the present invention.

FIG. 3A is a view illustrating an exemplary embodiment for receiving an N-th element combining color and symbol according to an exemplary embodiment of the present invention. Referring to FIG. 3A, the electronic device displays an icon for selecting one of color, a symbol, and a combination of color and symbol which are components by which the N-th element is to be identified together with a guide message saying to select the N-th element. The electronic device may allow a user to set an element of only color, an element of only a symbol, or an element combining color and symbol among elements combining color and symbol. The user may set an element of only color, an element of only a symbol, or an element combining color and symbol in order to release the lock of the electronic device. In the example illustrated in FIG. 3A, the electronic device has received an input such that an element combining color and symbol is set as the N-th element.

Figure 3B:
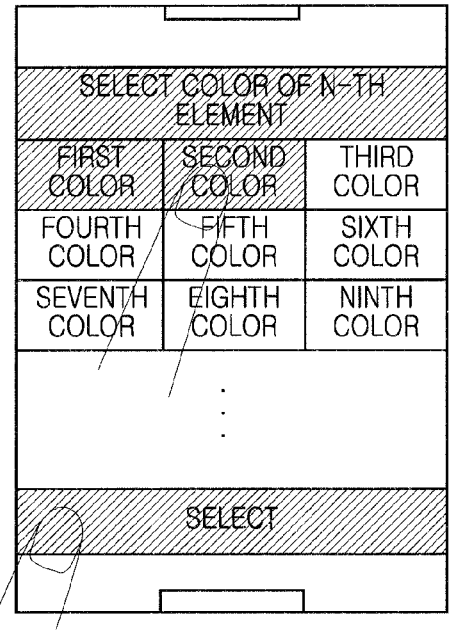

FIG. 3B is a view illustrating an exemplary embodiment for selecting color of the N-th element according to an exemplary embodiment of the present invention.

Referring to FIG. 3B, the electronic device that has received an input such that an element combining color and symbol is set as the N-th element displays a plurality of stored colors so that one of the colors may be selected together with a guide message saying to select color of the N-th element on the touchscreen. The plurality of stored colors may be any number of colors. In the example illustrated in FIG. 3B, the electronic device has received an input such that a second color is set as the color of the N-th element.

Figure 3C:
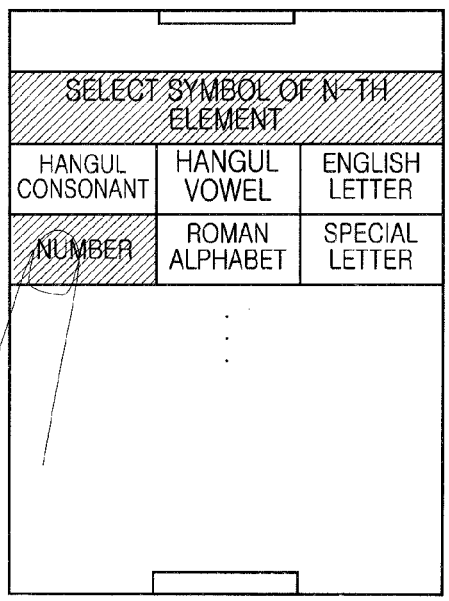

FIG. 3C is a view illustrating an exemplary embodiment for selecting a symbol of the N-th element according to an exemplary embodiment of the present invention.

Referring to FIG. 3C, the electronic device displays a plurality of stored symbols so that one of the symbols may be selected together with a guide message saying to select the symbol of the N-th element on the touchscreen. The plurality of stored symbols may include various symbols such as Hangul consonant, Hangul vowel, English letters (including capital and lower case letters), numbers, Roman alphabet, special letters, etc. In the example illustrated in FIG. 3C, the electronic device has received an input such that a number is set as a symbol of the N-th element.

Figure 3D:
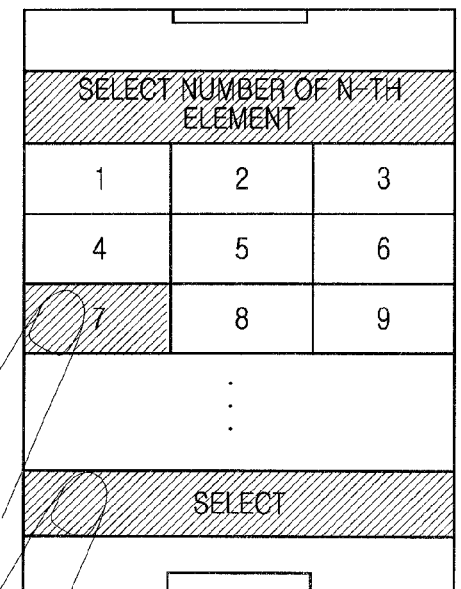

FIG. 3D is a view illustrating an exemplary embodiment for selecting a number of the N-th element according to an exemplary embodiment of the present invention.

Referring to FIG. 3D, the electronic device that has received an input such that an element of only a number is set as the N-th element displays numerical keys, etc. so that one of numbers may be selected together with a guide message saying to select a number of the N-th element on the touchscreen. In the example illustrated in FIG. 3D, the electronic device has received an input such that 7 is set as a number of the N-th element.

Figure 3E:
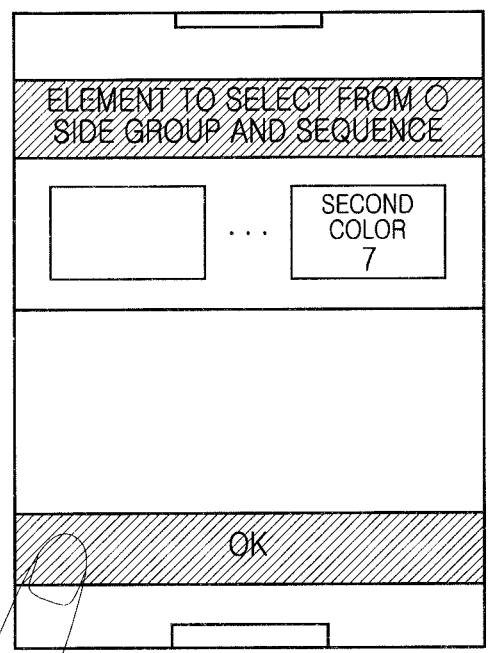

FIG. 3E is a view illustrating an exemplary embodiment where configuration of the N-th element has been finally set according to an exemplary embodiment of the present invention.

Referring to FIG. 3E, the electronic device may display configuration of the N-th element finally selected via the processes of FIG. 3A to FIG. 3D. In the example illustrated in FIG. 3E, N elements have been set, and an element of "7 of second color" has been set as the N-th element. Therefore, a guide message saying that N elements in total should be drag-traced from one side group in order to release lock is displayed on the touchscreen of the electronic device.

FIGS. 4A-4D are views illustrating a drag trace for releasing lock by selecting an element formed of stored various symbols three times according to an exemplary embodiment of the present invention.

Referring to FIGS. 4A-4D, when selecting three elements set for releasing lock setting of the electronic device and performing drag tracing according to the present invention, compared to a case of selecting two elements, security improves, but the set element should be selected one more time. However, this situation has lower security than a situation of selecting the set element four times and drag-tracing the element but has an advantage of releasing the lock more simply. Therefore, a user may select the number of elements for releasing the lock of the electronic device depending on personal taste. The user may set a greater number of elements for releasing the lock of the electronic device in situations where security of the electronic device in use needs to be reinforced, and a user who frequently uses the electronic device may set a lesser number of elements (e.g., two or three elements).

Figure 4A:
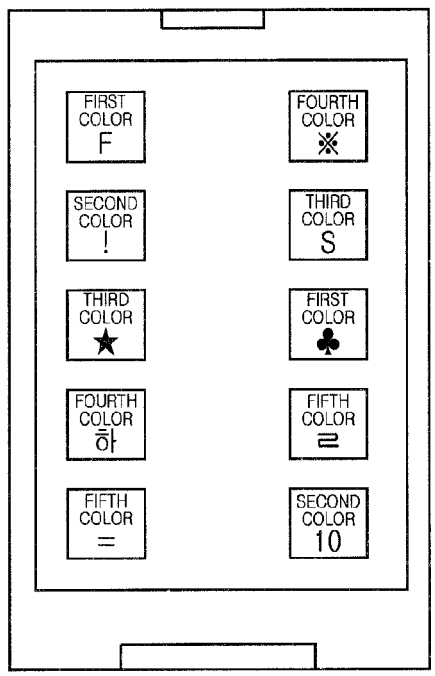
FIGS. 4A-4D are views illustrating a drag trace for releasing lock by selecting an element formed of stored various symbols three times according to an exemplary embodiment of the present invention.

FIG. 4A is a view illustrating an exemplary embodiment of an initial lock setting screen where elements combining English letters "F" and "S", a punctuation mark "!", special letters "★", "♣", "※", consonant "ㄹ" of Hangul, a number "10", a combination "하" of a consonant and a vowel of Hangul, and an operation symbol "=" among various symbols, and "first color" to "fifth color" among stored colors are included in two groups and displayed according to the present invention. When the user turns on power or a start button of the electronic device in order to use the electronic device, the initial lock setting screen as in the example illustrated in FIG. 4A is displayed on the touchscreen. In FIG. 4A, it is assumed that the user has set to select three elements including "! of second color", "10", and "하 of fourth color" in regular sequence in order to release the lock of the electronic device, and the sequence of a drag trace has been set to start from the left group. Though the two groups are symmetrically arranged and five elements are included and displayed in each group as another assumption according to the present exemplary embodiment, at least two elements may be included in one group and three or more groups may be symmetrically arranged. The number of lines and the number of elements are not limited to the present exemplary embodiment. Also, various stored symbols forming an element may be combined and arranged at random, and as illustrated in FIG. 4A, only one of the symbols may be set to combine with the stored colors.

Figure 4B:
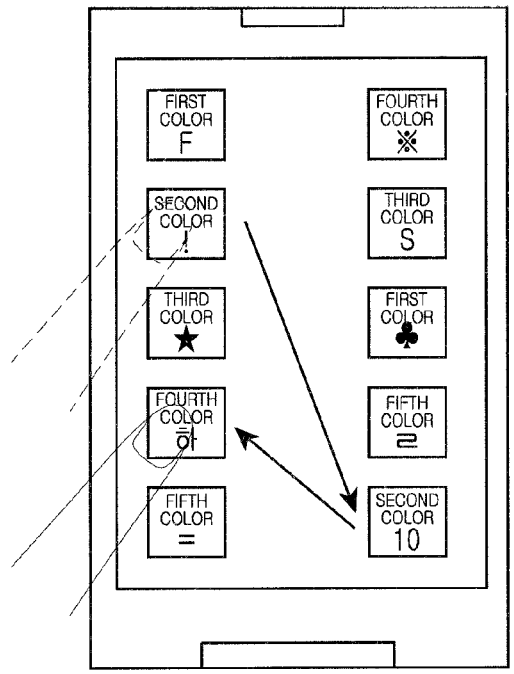

FIG. 4B is a view illustrating an exemplary embodiment for releasing lock in an initial lock setting screen according to the present invention. As assumed via FIG. 4A, the user should start a drag trace from a left group and select three elements including "! of second color", "10", and "하 of fourth color" in regular sequence in order to release the lock of the electronic device. The user should know to start the drag trace from the left group and select the three elements including "! of second color", "10", and "하 of fourth color" in regular sequence in order to release the lock of the electronic device. Hereinafter, a specific process for releasing the lock of the electronic device is described.

First, the user selects the element including "! of second color" among the elements arranged in the left group in the memorized regular sequence in order to release the lock setting of the electronic device. Both color and symbol of the element of "! of second color" arranged second from top of the left group act as identification components to a user. Therefore, the user should select an element with a combination of "! of second color". After that, the user performs a drag with the element including "! of second color" selected to select an element of "10 of second color" arranged in the right group. In the same meaning, as an element to select second, only a number of "10" acts as an identify component and "second color" is not considered by the user who desires to release the lock setting. Therefore, the user may select only an element including "10" and does not need to consider the color combining with "10". Again, the user continues to perform the drag with the element of "10 of second color" selected to select an element including "하 of fourth color" arranged fourth from top of the left group. In the same meaning, both color and symbol of an element to select third act as identification components. Therefore, the user should select an element with combination of "하 of fourth color". When the above process is completed, the lock set to the initial screen of the electronic device is released.

Figure 4C:
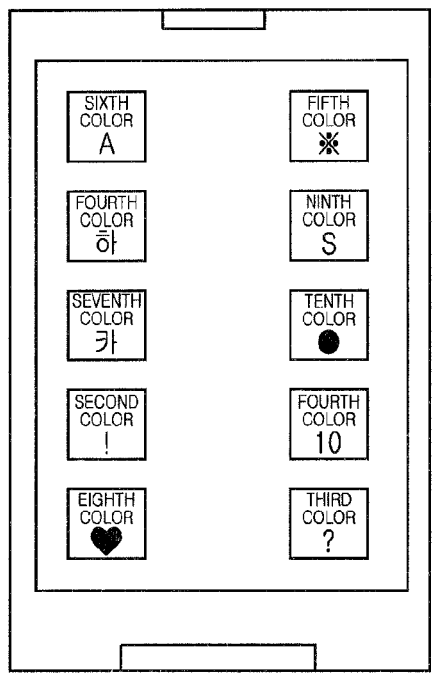

FIG. 4C is a view illustrating another exemplary embodiment of a lock setting screen where elements combining various symbols and stored color are included in two lines and displayed. Elements combining various stored symbols and a plurality of stored colors may be displayed at random all the time on the touchscreen of the electronic device. Elements are newly rearranged for each group all the time with a very large number of potential arrangements. Therefore, since exemplary embodiments of the present invention does not form a fixed drag trace as in the method for releasing a pattern password according to the related art, but involves a pattern password using a new drag trace all the time, exemplary embodiments the present invention has an advantage of reinforcing security of a user. However, components of elements set for releasing lock setting of the electronic device should be displayed in each group so that the user may select the components. For example, as illustrated in FIG. 4C, an element including "! of second color" and an element including "하 of fourth color" should be arranged in the left group, and an element including "10" should be arranged in the right group to allow the user to select the component.

Figure 4D:
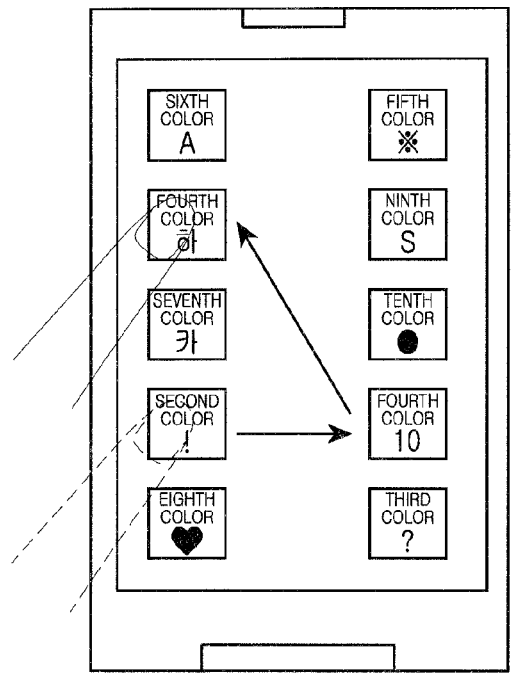

FIG. 4D is a view illustrating another exemplary embodiment for releasing lock on a lock setting screen according to an exemplary embodiment of the present invention.

As assumed via FIG. 4A, the user should start a drag trace from the left group and select three elements including "! of second color", "10", and "하 of fourth color" in regular sequence in order to release the lock of the electronic device. That is, the user should know to start the drag trace from the left group and select the three elements including "! of second color", "10", and "하 of fourth color" in regular sequence in order to release the lock of the electronic device. Hereinafter, a specific process for releasing the lock of the electronic device is described.

First, the user selects an element including "! of second color" among elements arranged in the left group in a memorized sequence in order to release the lock setting of the electronic device. Both color and a symbol of the element of "! of second color" arranged fourth from top of the left group act as identification components to the user. Therefore, the user should select the element with the combination of "! of second color". After that, the user performs a drag with the element including "! of second color" selected to select an element of "10 of fourth color" arranged in the right group. In the same meaning, as an element to select second, only a number of "10" acts as an identification component and "fourth color" is not considered by the user who desires to release the lock setting. Therefore, the user may select only an element including "10" and does not need to consider the color combining with "10". Again, the user continues to perform the drag with the element of "10 of fourth color" selected to select an element including "하 of fourth color" arranged second from top of the left group. In the same meaning, both color and symbol of an element to select third act as identify components. Therefore, the user should select an element with the combination of "하 of fourth color". When the above process is completed, the lock set to the initial screen of the electronic device is released. Consequently, when compared to the drag trace illustrated in the exemplary embodiment of FIG. 4B and FIG. 4D, it is revealed that a totally different drag trace is formed all the time. Therefore, there is nearly no case where pattern forming for releasing the lock of the electronic device is easily exposed to other people. Though an exemplary embodiment of a drag trace for releasing the lock by selecting an element including various symbols three times has been described in the present exemplary embodiment, an element may be selected two or four or more times, of course. Also, it is obvious that an element may be represented using only one symbol, and the symbol may exist by the large number of cases.

Figure 5:
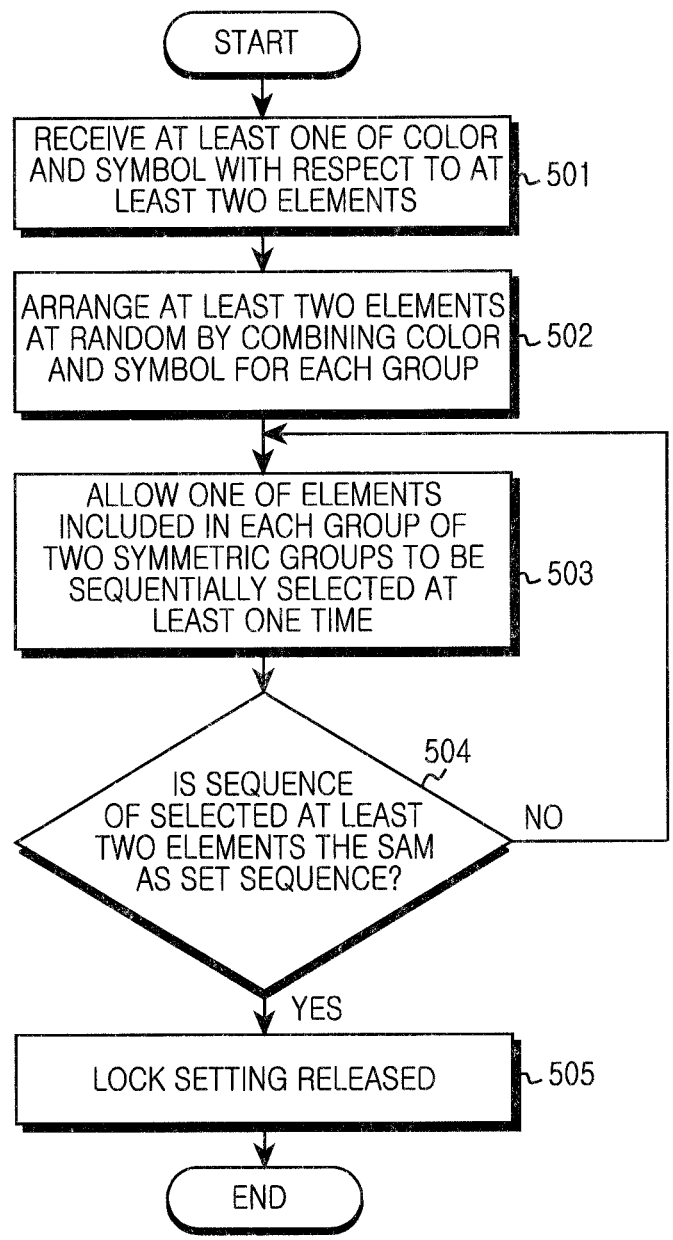
FIG. 5 is a flowchart for releasing a lock of an electronic device by selecting an element combining color and symbol according to an exemplary embodiment of the present invention.

FIG. 5 is a flowchart for releasing a lock of an electronic device by selecting an element combining color and symbol according to an exemplary embodiment of the present invention.

Referring to FIG. 5, the electronic device receives at least one of a color and a symbol with respect to at least two elements in step 501. At least two elements may be included and displayed in each line. An element may be defined as being identified by a color, a symbol, and a combination of a color and a symbol. The user may set the total number of elements to select as well as a color and a symbol of each element in order to release the lock of the electronic device. Each element may be discriminated by color, a symbol, and a combination of color and symbol. The user may set an element of only color, set an element of only a symbol, and set an element combining color and symbol in order to release the lock of the electronic device. For example, the user may set an element of "first color", set an element of "a first symbol", and set an element of "first color and first symbol" in order to release the lock of the electronic device. Therefore, each element may be identified by color, a symbol, and a combination of color and symbol.

The electronic device that has received at least one of color and symbol with respect to the at least two elements arranges the at least two elements for each group at random by combining color and symbol in step 502. An arrangement of at least two elements displayed for each group on the touchscreen of the electronic device initially is not fixed but may change all the time. For example, even when five elements of "A of first color", "B of second color", "C of third color", "D of fourth color", and "E of fifth color" are arranged in regular sequence in one group initially, when the elements are arranged afterward, the above sequence is mixed at random and the elements may be rearranged in sequence of "E of sixth color", "C of seventh color", "B of eighth color", "A of fourth color", and "B of fifth color", as well as other sequences. However, the elements are rearranged with an element of color, a symbol, or combination of color and symbol set for releasing the lock of the electronic device by the user fixed. For example, in the above example, suppose that "B of second color" and "D of fourth color" are elements set for releasing the lock of the electronic device. Color and symbol of other elements may be mixed at random and rearranged but the combinations of "B of second color" and "D of fourth color" do not change, while the sequence (i.e., position with their respective groups) in which the elements of "B of second color" and "D of fourth color" are displayed may change. Also, when the electronic device allows the user to select elements differently from the set sequence, the respective elements are rearranged at random differently from the initial arrangement.

The electronic device that has arranged elements combining color and symbol at random allows the user to sequentially select one element included in each of the two symmetric groups at least one time in step 503. At least two elements are included in each group, and at least two elements combining color and symbol should be selected for releasing the lock of the electronic device. One element included in each of the two symmetric groups should be sequentially selected at least one time for releasing the lock of the electronic device. When one element displayed on the touchscreen is selected an odd number of times, assuming that a drag trace starts in a first group of the two groups, the drag trace ends in the first group.

For example, suppose a case where elements for releasing the lock of the electronic device are set in a sequence of the elements of "A of first color", "B of fourth color", and "E of fifth color". Under the above supposition, the electronic device may release the lock only when a drag trace is performed in a sequence of the element of "A of first color", the element of "B of fourth color", and the element of "E of fifth color". when one element displayed on the touchscreen is selected an odd number of times, the drag trace ends in the group where the drag trace starts. Similarly, when one element displayed on the touchscreen is selected an even number of times, assuming that a drag trace starts in a first group of the two groups, the drag trace ends in a second group. For example, suppose that elements for releasing the lock of the electronic device have been set in a sequence of elements of "A of first color" and "B of fourth color". Under the above supposition, the electronic device may release the lock only when a drag trace is performed in a sequence of elements of "A of first color" and "B of fourth color". When one element displayed on the touchscreen is selected an even number of times, the drag trace ends in a group symmetric with the group where the drag trace starts.

The electronic device determines whether a sequence of the selected at least two elements is the same as the set sequence in step 504. The electronic device releases the lock only when elements are selected in the sequence of elements set for releasing the lock of the electronic device, and when determining that the sequence of the selected elements is not the same as the set sequence of the elements, the electronic device rearranges elements.

When determining that the sequence of the selected at least two elements is the same as the set sequence, the electronic device releases the lock in step 505. Elements combining stored symbols and a plurality of stored colors may be displayed at random all the time on the touchscreen of the electronic device. Elements are newly rearranged for each group all the time with a large number of cases. Therefore, since exemplary embodiments of the present invention does not form a fixed drag trace as in the method for releasing a pattern password according to the related art, but rather releases a pattern password using a new drag trace all the time, exemplary embodiments of the present invention has an advantage of reinforcing security of a user.

When determining that the sequence of the selected at least two elements is not the same as the set sequence in step 504, the electronic device returns to the preceding step 503.

Figure 6:
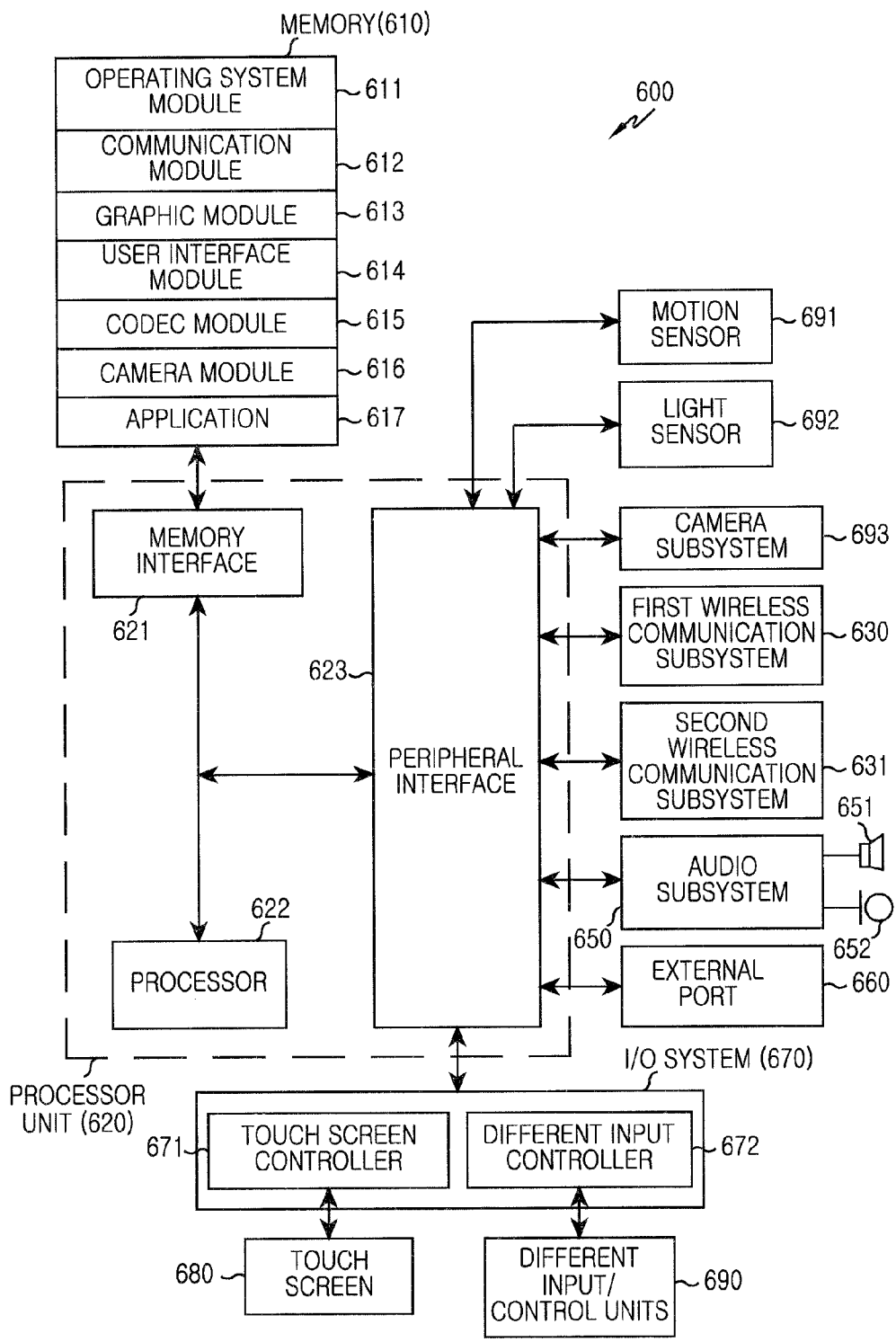
FIG. 6 is a block diagram illustrating the construction of an electronic device according to an exemplary embodiment of the present invention.

FIG. 6 is a block diagram 600 illustrating the construction of an electronic device according to an exemplary embodiment of the present invention.

Referring to FIG. 6, the electronic device 600 may be a portable electronic device, and may be a device such as a portable terminal, a mobile phone, a mobile pad, a media player, a tablet computer, a handheld computer, and a Personal Digital Assistant (PDA). However, the electronic device may be any type of electronic device, including a device combining two or more functions of the above-listed devices.

The electronic device 600 includes a memory 610, a processor unit 620, a first wireless communication subsystem 630, a second wireless communication subsystem 631, an audio subsystem 650, a speaker 651, a microphone 652, an external port 660, an Input/Output (I/O) subsystem 670, a touchscreen 680, and a different input/control unit 690. A plurality of memories 610 and external ports 660 may be used.

The processor unit 620 may include a memory interface 621, one or more processors 622, and a peripheral interface 623. Depending on cases, the entire processor unit 620 may be referred to as a processor. According to an exemplary embodiment of the present invention, when determining that the sequence of sequentially selected elements is the same as a set sequence, the processor unit 620 releases the lock. When one element is selected an odd number of times, the processor unit 620 determines that a drag trace starts in a first group of the two groups, and ends in the first group. When one element is selected an even number of times, the processor unit 620 determines that a drag trace starts in the first group of the two groups and ends in a second group of the two groups. At least two elements are included in each group, and at least two elements combining color and symbol should be selected for releasing the lock of the electronic device. One element included in each of the two symmetric groups should be sequentially selected at least one time for releasing the lock of the electronic device. Assuming that a drag trace starts in the first group of the two groups when one element displayed on the touchscreen is selected an odd number of times, the drag trace ends in the first group. For example, suppose a case where elements for releasing the lock of the electronic device are set in a sequence of elements of "A of first color", "B of fourth color", and "E of fifth color". Under the above supposition, the electronic device may release the lock only when a drag trace is performed in a sequence of elements of "A of first color", "B of fourth color", and "E of fifth color". When one element displayed on the touchscreen is selected an odd number of times, the drag trace ends in the group where the drag trace starts.

Similarly, when one element displayed on the touchscreen is selected an even number of times, a drag trace starts in a first group of the two groups, the drag trace ends in a second group. For example, suppose a case where elements for releasing lock of the electronic device are set in a sequence of elements of "A of first color" and "B of fourth color". Under the above supposition, the electronic device may release the lock only when a drag trace is performed in a sequence of elements of "A of first color" and "B of fourth color". When one element displayed on the touchscreen is selected an even number of times, a drag trace ends in a group symmetric with the group where the drag trace starts.

The processor unit 620 determines whether a sequence of selected at least two elements is the same as a set sequence. When determining that the sequence of the selected at least two elements is not the same as the set sequence, the processor unit 620 rearranges at least two elements included in each group at random. When the user erroneously inputs elements for releasing the lock setting, the electronic device rearranges the elements that were arranged in each group previously. The electronic device combines set symbols and set colors again and arranges them again on the touchscreen. Therefore, even when a third party sees the shape of a drag trace input by a user by accident, since the elements are rearranged on the touchscreen of the electronic device, there is no problem in security. However, components of elements set for releasing the lock setting of the electronic device should be displayed on each group so that the user may select the elements set for releasing the lock.

The processor 622 executes various software programs to perform various functions for the electronic device 600, and also performs a process and a control for voice communication and data communication. In addition to these general functions, the processor 622 executes a specific software module (an instruction set) stored in the memory 610 to perform various specific functions corresponding to the module. The processor 622 performs a method of an exemplary embodiment of the present invention in cooperation with software modules stored in the memory 610.

The processor 622 may include one or more data processors, image processors, or codecs. The data processor, the image processor, and the codec may be configured separately. Also, the data processor, the image processor, and the codec may be configured in the form of a plurality of processors performing different functions. The peripheral interface 623 connects the I/O subsystem 670 of the electronic device 600 and various peripheral devices to the processor 622 and the memory 610 (via the memory interface).

Various elements of the electronic device 600 may be coupled by one or more communication buses (reference numeral not shown) or stream lines (reference numeral not shown).

The external port 660 is used for directly connecting a portable electronic device (not shown) to a different electronic device or indirectly connecting the portable electronic device to a different electronic device via a network (for example, the Internet, an intranet, a wireless LAN, etc.). Though not limited thereto, the external port 660 may be a Universal Serial Bus (USB) port or a Firewire™ port, and the like.

A motion sensor 691 and a first light sensor 692 are coupled to the peripheral interface 623 to enable various functions. For example, the motion sensor 691 and the light sensor 692 may be coupled to the peripheral interface 623 to enable detection of movement of the electronic device and detection of light from the outside, respectively. In addition, other sensors such as a position measuring system, a temperature sensor, or a living body sensor, and the like may be connected to the peripheral interface 623 to perform related functions.

A camera subsystem 693 may perform a camera function such as a photo and video clip recording.

The light sensor 692 may be a Charged Coupled Device (CCD) or a Complementary Metal-Oxide Semiconductor (CMOS) device.

The electronic device performs a communication function via one or more wireless communication subsystems 630 and 631. The wireless communication subsystems 630 and 631 may include a Radio Frequency (RF) receiver and a transceiver and/or a light (for example, infrared) receiver and a transceiver. The first communication subsystem 630 and the second communication subsystem 631 may be discriminated depending on a communication network via which the electronic device 600 communicates. For example, though not limited thereto, the communication network may include a communication subsystem designed to operate via a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wi-Fi network, a WiMax network, a Bluetooth network, and/or the like. However, in cases where a Wi-Fi communication via a Wi-Fi network is employed, the first wireless communication subsystem 630 and the second wireless communication subsystem 631 may merge to form one wireless communication subsystem.

The audio subsystem 650 may be coupled to the speaker 651 and the microphone 652 to take charge of input and output of an audio stream such as voice recognition, voice duplication, digital recording, and a telephone function. The audio subsystem 650 communicates with a user via the speaker 651 and the microphone 652. The audio subsystem 650 receives a data stream via the peripheral interface 623 of the processor unit 620, and converts the received data stream into an electric stream. The converted electric stream (electric signal) is transferred to the speaker 651. The speaker 651 converts the electric stream to a sound wave that can be heard by people, and outputs the same. The microphone 652 converts a sound wave transferred from people or other different sound sources to an electric stream. The audio subsystem 650 receives an electric stream converted from the microphone 652. The audio subsystem 650 converts the received electric stream to an audio data stream, and transfers the converted audio data stream to the peripheral interface 623. The audio subsystem 650 may include an attachable and detachable ear phone, head phone, or head set.

The I/O subsystem 670 may include a touchscreen controller 671 and/or a different input controller 672. The touchscreen controller 671 may be coupled to the touchscreen 680. Though not limited thereto, the touchscreen 680 and the touchscreen controller 671 may detect a contact and movement or stoppage of these using an arbitrary multi-touch detection technology including other proximity sensor arrangement or other elements as well as capacitive, resistive, infrared and surface acoustic wave technologies for determining one or more contact points with the touchscreen 680. The different input controller 672 may be coupled to the different input/control unit 690. The different input/control unit 690 may be one or more buttons, a rocker switch device, a thumb-wheel, a dial, a stick, and/or a pointer device such as a stylus.

The touchscreen 680 provides an input/output interface between the electronic device 600 and a user. The touchscreen 680 transfers a user's touch input to the electronic device 600. The touchscreen 680 also serves as a medium for showing an output from the electronic device 600 to the user. The touchscreen 680 shows a visual output to the user. This visual output is represented in the form of text, graphics, video, and a combination thereof.

Various displays may be used as the touchscreen 680. For example, while not limited thereto, a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED may be used as the touchscreen 680.

According to exemplary embodiments of the present invention, the touchscreen 680 displays groups such that the groups including at least two elements combining color and symbol may be symmetric, and one element included in each of the symmetric two groups is sequentially selected at least one time. When the user turns on power or a start button of the electronic device in order to use the electronic device, a first group and a second group may be symmetrically displayed on the touchscreen of the electronic device. Each of the first group and the second group includes at least two elements. The two groups may be symmetrically displayed on the touchscreen of the electronic device. The two groups may be symmetrically displayed on the touchscreen of the electronic device left and right or may be symmetrically displayed up and down. In addition, as in the present exemplary embodiment, the two groups may be symmetrically displayed on the touchscreen of the electronic device but three groups or four groups may be symmetrically displayed left and right or up and down. The two groups may be symmetric with each other on the touchscreen of the electronic device, so that the user may select one element included in the first group and the second group at least one time in regular sequence to release the lock of the electronic device.

The user may set a group where a drag trace starts among the two groups in order to release the lock of the electronic device. When the user sets a specific group as the group where the drag trace starts, the user should select one element included in the relevant group first in order to release the lock of the electronic device. For example, when the user sets a first group as the group where the drag trace starts, the user should select one element of the first group and then select one element included in the second group. When the user sets a second group as the group where the drag trace starts, the user should select one element of the second group and then select one element included in the first group. It is convenient that a right-handed user sets the first group arranged to the left of the touchscreen of the electronic device as the group where the drag trace starts. It is convenient that a left-handed user sets the second group arranged to the right of the touchscreen of the electronic device as the group where the drag trace starts. As mentioned above however, any group may be set as the group where the drag trace starts.

The memory 610 may be coupled to the memory interface 621. The memory 610 may include a high speed random access memory such as one or more magnetic disk storage devices and/or a non-volatile memory, one or more optical storage devices and/or a flash memory (for example, NAND, NOR).

The memory 610 stores software. These software elements may include an operating system module 611, a communication module 612, a graphics module 613, a user interface module 614, a codec module 615, a camera module 616, and one or more application modules 617. Since a module which is a software element can be expressed as a set of instructions, the module may be also expressed as an instruction set. The module is also expressed as a program. According to exemplary embodiments of the present invention, the memory 610 stores electronic contents and at least one input mark together, stores a moving picture of an extracted section, stores electronic contents and an input highlight mark together to generate a highlight list, calls a stored highlight list, and calls a stored drawing list. The operating system software 611 (for example, Windows™, Linux, Darwin, RTXC, UNIX, OS X, or a built-in operating system such as VxWorks) includes various software elements controlling the general system operation. The control of the general system operation denotes memory management and control, storing software (device) control and management, power control and management, etc., for example. The operation system software also performs a function for smoothing communication between various hardware (devices) and software elements (modules).

The communication module 612 enables communication with other electronic devices such as a computer, a server and/or a portable terminal via the wireless communication subsystems 630 and 631 or the external port 660.

The graphics module 613 includes various software elements for providing and displaying graphics on the touchscreen 680. A terminology of "graphics" is used as a meaning including text, a web page, an icon, a digital image, a video, an animation, and the like.

The user interface module 614 includes various software elements related to the user interface. That is, the user interface module 614 includes contents regarding how a state of the user interface changes or under what condition a change of the user interface state is performed.

The codec module 615 may include software elements related to encoding and decoding of a video file. The codec module 615 may include an MPEG module and/or a video stream module such as an H204 module. The codec module 615 may include various codec modules for an audio file such as AAA, AMR, WMA, etc. The codec module 615 may also include an instruction set corresponding to an exemplary embodiment method of the present invention.

The camera module 616 includes a camera related software element enabling camera related processes and functions.

The application module 617 includes a browser, an e-mail, an instant message, word processing, keyboard emulation, an address book, a touch list, a widget, Digital Rights Management (DRM), voice recognition, voice duplication, a position determining function, a position based service, etc.

Also, various functions of the electronic device 600 according to exemplary embodiments of the present invention mentioned above or to be mentioned may be executed by hardware and/or software and/or combination of these including one or more stream processors and/or Application Specific Integrated Circuit (ASIC).

According to an electronic device and a method thereof for releasing lock using elements combining color and symbol, a speed for releasing the lock of the electronic device can be improved, and simultaneously a user's security may be reinforced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a user-interface displayed on an electronic device, the method comprising:
  displaying at least two groups in the user-interface while the user-interface is in a first state, a first group comprising at least two elements by a combination of a color component and a symbol component, a second group comprising at least two elements by a combination of the color component and the symbol component that is different from the first group;

allowing one element from each group of the at least two groups to be selected sequentially at least one time; and when a sequence of the sequentially selected elements is the same as a set sequence, transitioning the user-interface from the first state to a second state, wherein the at least two elements are arranged at random each time the at least two groups are displayed, with different combinations of the color component and the symbol component for each group, and wherein the at least two elements are arranged such that the color component and the symbol component do not overlap for each group.

2. The method of claim 1, wherein the allowing of the one element from each group of the at least two groups to be selected sequentially at least one time comprises:

when the one element is selected an odd number of times, repeating a process, at least one time, of starting a drag trace with a selection of a first element included in a first group of the at least two groups, and allowing a third element included in the first group to be selected after a second element included in a second group of the at least two groups is selected.

3. The method of claim 1, wherein the allowing of the one element from each group of the at least two groups to be selected sequentially at least one time comprises:

when the one element is selected an even number of times, repeating a process, at least one time, of starting a drag trace with a selection of a first element included in a first group of the at least two groups, and allowing a second element included in a second group of the at least two groups to be selected.

4. The method of claim 1, further comprising:

determining whether the sequence of the selected at least two elements is the same as the set sequence.

5. The method of claim 4, further comprising:

when determining that the sequence of the selected at least two elements is not the same as the set sequence, rearranging at least two elements included in each group of the at least two groups at random.

6. The method of claim 1, wherein the sequence of the sequentially selected elements is a drag trace for transitioning the user-interface from a locked state to an unlocked state.

7. The method of claim 6, wherein the drag trace changes whenever an input is made.

8. The method of claim 1, wherein at least one group of the at least two groups comprises a line.

9. The method of claim 1, wherein the at least two groups comprise two groups.

10. An electronic device including a user-interface displayed over the electronic device, the electronic device comprising:

a touchscreen configured to display at least two groups in the user-interface while the user interface is in a first state, a first group comprising at least two elements by a combination of a color component and a symbol component and a second group comprising at least two elements by a combination of the color component and the symbol component that is different from the first group; and a processor unit for, allowing one element from each group of the at least two groups to be selected sequentially at least one time, and when a sequence of the sequentially selected element is the same as a set sequence, transitioning the user-interface from the first state to a second state, wherein the at least two elements are arranged at random each time the at least two groups are displayed, with different combinations of the color component and the symbol component for each group, and wherein the at least two elements are arranged such that the color component and the symbol component do not overlap for each group.

11. The electronic device of claim 10, wherein, when the one element from each group of the at least two groups is selected an odd number of times, the processor unit repeats a process, at least one time, of starting a drag trace with a selection of a first element included in a first group of the at least two groups, and allowing a third element included in the first group to be selected when a second element included in a second group of the at least two groups is selected.

12. The electronic device of claim 10, wherein, when the one element from each group of the at least two groups is selected an even number of times, the processor unit repeats a process, at least one time, of starting a drag trace with a selection of a first element included in a first group of the at least two groups, and allowing a second element included in a second group of the at least two groups to be selected.

13. The electronic device of claim 10, wherein the processor unit determines whether the sequence of the selected at least two elements is the same as the set sequence.

14. The electronic device of claim 13, wherein, when the processor unit determines that the sequence of the selected at least two elements is not the same as the set sequence, the processor unit rearranges at least two elements included in each group of the at least two groups at random.

15. The electronic device of claim 10, wherein the sequence of the sequentially selected elements is a drag trace for transitioning the user-interface from a locked state to an unlocked state.

16. The electronic device of claim 15, wherein the drag trace changes whenever an input is made.

17. The electronic device of claim 10, wherein at least one group of the at least two groups comprises a line.

18. The electronic device of claim 10, wherein the at least two groups comprise two groups.

* * * * *